(12) United States Patent
Yoshida et al.

(10) Patent No.: US 11,634,807 B2
(45) Date of Patent: Apr. 25, 2023

(54) ZINC-PLATED STEEL SHEET FOR HOT STAMPING AND PRODUCTION METHOD THEREFOR

(71) Applicant: Kobe Steel, Ltd., Kobe (JP)

(72) Inventors: Takatoshi Yoshida, Kakogawa (JP); Yosuke Ukawa, Kakogawa (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 16/976,865

(22) PCT Filed: Feb. 6, 2019

(86) PCT No.: PCT/JP2019/004182
§ 371 (c)(1),
(2) Date: Aug. 31, 2020

(87) PCT Pub. No.: WO2019/167573
PCT Pub. Date: Sep. 6, 2019

(65) Prior Publication Data
US 2020/0407833 A1 Dec. 31, 2020

(30) Foreign Application Priority Data
Mar. 2, 2018 (JP) .............................. JP2018-037132

(51) Int. Cl.
*C22C 38/06* (2006.01)
*C22C 38/04* (2006.01)
*C22C 38/02* (2006.01)
*C23C 2/06* (2006.01)
*C23C 2/40* (2006.01)
*C23C 2/02* (2006.01)
*C21D 9/46* (2006.01)
*B32B 15/01* (2006.01)
(Continued)

(52) U.S. Cl.
CPC .............. *C23C 2/06* (2013.01); *B32B 15/013* (2013.01); *B32B 15/04* (2013.01); *B32B 15/043* (2013.01); *B32B 15/18* (2013.01); *C21D 1/18* (2013.01); *C21D 1/26* (2013.01); *C21D 1/74* (2013.01); *C21D 1/76* (2013.01); *C21D 3/04* (2013.01); *C21D 6/005* (2013.01); *C21D 6/008* (2013.01); *C21D 8/0257* (2013.01); *C21D 8/0436* (2013.01); *C21D 8/0457* (2013.01); *C21D 9/46* (2013.01); *C21D 9/48* (2013.01); *C22C 38/00* (2013.01); *C22C 38/02* (2013.01); *C22C 38/04* (2013.01); *C22C 38/06* (2013.01); *C23C 2/02* (2013.01); *C23C 2/26* (2013.01); *C23C 2/28* (2013.01); *C23C 2/40* (2013.01); *C23C 28/021* (2013.01); *C23C 28/025* (2013.01); *C23C 28/3225* (2013.01); *C23C 28/345* (2013.01); *C23C 30/00* (2013.01); *C23C 30/005* (2013.01); *Y10T 428/1259* (2015.01); *Y10T 428/1266* (2015.01); *Y10T 428/12583* (2015.01); *Y10T 428/12611* (2015.01); *Y10T 428/12618* (2015.01); *Y10T 428/12667* (2015.01); *Y10T 428/12799* (2015.01); *Y10T 428/12951* (2015.01); *Y10T 428/12965* (2015.01); *Y10T 428/12972* (2015.01)

(58) Field of Classification Search
CPC . C23C 28/3225; C23C 28/345; C23C 28/025; C23C 28/021; C23C 2/06; C23C 2/28; C23C 2/02; C23C 2/40; C23C 2/26; C23C 30/00; C23C 30/005; C22C 38/00; C22C 38/02; C22C 38/04; C22C 38/06; C21D 9/48; C21D 9/46; C21D 8/0247; C21D 8/0257; C21D 8/0436; C21D 1/26; C21D 1/76; C21D 1/74; C21D 6/008; C21D 6/005; C21D 3/04; C21D 8/0457; B32B 15/013; B32B 15/04; B32B 15/043; B32B 15/18; Y10T 428/12583; Y10T 428/1259; Y10T 428/12611; Y10T 428/12618; Y10T 428/1266; Y10T 428/12667; Y10T 428/12799; Y10T 428/12951; Y10T 428/12965; Y10T 428/12972
See application file for complete search history.

(56) References Cited

U.S. PATENT DOCUMENTS

2013/0180305 A1  7/2013  Warnecke et al.
2015/0125716 A1  5/2015  Kojima et al.
(Continued)

FOREIGN PATENT DOCUMENTS

JP  2007-56307 A    3/2007
JP  2008-284610 A  11/2008
(Continued)

OTHER PUBLICATIONS

International Search Report dated Apr. 9, 2019 in PCT/JP2019/004182 filed on Feb. 6, 2019, 2 pages.

Primary Examiner — Michael E. La Villa
(74) Attorney, Agent, or Firm — Oblon, McClelland, Maier & Neustadt, L.L.P.

(57) ABSTRACT

A zinc-plated steel sheet for hot stamping according to an aspect of the present invention includes a steel substrate and a plated layer provided on a surface of the steel substrate, in which the steel substrate contains, in % by mass, C: 0.10 to 0.5%, Si: 0.7 to 2.5%, Mn: 1.0 to 3%, and Al: 0.01 to 0.5%, with the balance being iron and inevitable impurities, and the steel substrate has, in the inside thereof, an internal oxide layer consists of an oxide containing at least one of Si and Mn having a thickness of 1 μm or more, and a decarburized layer having a thickness of 20 μm or less from an interface with the plated layer toward an internal direction of the steel substrate.

3 Claims, No Drawings

(51) Int. Cl.
*C21D 6/00* (2006.01)
*C21D 8/04* (2006.01)
*C21D 9/48* (2006.01)
*C21D 3/04* (2006.01)
*C21D 1/26* (2006.01)
*C21D 1/76* (2006.01)
*C23C 28/00* (2006.01)
*C23C 2/28* (2006.01)
*C22C 38/00* (2006.01)
*C21D 1/18* (2006.01)
*C21D 8/02* (2006.01)
*C21D 1/74* (2006.01)
*B32B 15/18* (2006.01)
*B32B 15/04* (2006.01)
*C23C 28/02* (2006.01)
*C23C 30/00* (2006.01)
*C23C 2/26* (2006.01)

(56) References Cited

U.S. PATENT DOCUMENTS

| 2016/0032439 | A1 | 2/2016 | Kojima et al. |
| 2016/0230259 | A1 | 8/2016 | Tanaka et al. |
| 2019/0024208 | A1* | 1/2019 | Kitazawa ............... C22C 38/02 |
| 2020/0325554 | A1* | 10/2020 | Takeda ................... C22C 38/12 |

FOREIGN PATENT DOCUMENTS

| JP | 2016-89274 A | 5/2016 |
| JP | 2016-532775 A | 10/2016 |
| JP | 2017-2384 A | 1/2017 |
| JP | 2017-186663 A | 10/2017 |
| WO | WO 2015/097882 A1 | 7/2015 |

* cited by examiner

US 11,634,807 B2

ZINC-PLATED STEEL SHEET FOR HOT STAMPING AND PRODUCTION METHOD THEREFOR

TECHNICAL FIELD

The present invention relates to a zinc-plated steel sheet for hot stamping and a production method therefor.

BACKGROUND ART

Automotive parts are generally produced by press-forming a steel sheet. As the steel sheet for automotive parts, a steel sheet subjected to pickling after hot-rolling (hereinafter referred to as a "hot-rolled pickled steel sheet"), and a cold-rolled steel sheet are used. Furthermore, a plated steel sheet produced by plating such a steel sheet can also be used for the purpose of improving corrosion resistance. The plated steel sheets are mainly classified into a galvanized (Zn-coated) steel sheet and an aluminum (Al) coated steel sheet, and the galvanized steel sheet is widely used in terms of the corrosion resistance and the like.

In recent years, as a technique that can achieve both increase in strength and formation of a complicated shape in the manufacture of automotive parts, hot stamping has been proposed in which a steel sheet (hot-rolled pickled steel sheet, cold-rolled steel sheet, or plated steel sheet produced using the above steel sheet as a steel substrate) is pressed at high temperatures for production. The hot stamping is also called as hot forming, hot press, or the like, and is a method for press-forming the above steel sheet by heating the sheet at a high temperature above a temperature range (above $Ac_1$ transformation point) of austenite+ferrite. Such hot stamping can produce automotive parts having a complicated shape while having a high strength. Hereinafter, a part obtained by hot stamping a steel sheet is also referred to as a "hot stamped component".

As a steel sheet used for hot stamping, a steel sheet containing elements such as Si and Mn and having a good quenching property and relatively high productivity during pressing is already known.

However, when this steel sheet is used as a steel substrate of a hot-dip galvanized steel sheet, there is a problem of occurrence of appearance defects such as bare spot and alloying unevenness occurring when a plated layer is alloyed.

This is because Si and Mn diffuse and concentrate on a surface of the steel sheet when reduction annealing is performed before the steel substrate is plated in a hot dip coating line. In general, among elements added to steel, Si and Mn are elements that are more easily oxidized than Fe (oxidizable elements), so that the concentrated Si and Mn are selectively oxidized, and a film composed of oxides of Si and Mn is formed on the steel sheet surface. Since Si, Mn, and oxides thereof have poor wettability with molten zinc, the appearance defects described above occur when the steel substrate having Si and Mn concentrated on the surface is plated.

As a technique for suppressing the occurrence of such an appearance defect, Patent Literature 1 discloses a technique of performing reduction annealing of a steel substrate of a zinc-plated steel sheet for hot stamping containing oxidizable elements such as Si and Mn in a temperature range where Si, Mn. etc. are not precipitated as an oxide on a surface, or in a temperature range where concentration on the surface is extremely small even if the precipitation occurs.

Patent Literature 2 discloses a technique of galvanizing a steel sheet containing 0.1 to 0.5% by mass of C, 0.05 to 0.5% by mass of Si, and 0.5 to 3% of Mn to give a high-strength hot stamp steel sheet excellent in press formability and corrosion resistance after coating. In the steel sheet described in Patent Literature 2, by setting the Si content in the steel that causes bare spot and alloying unevenness to 0.5% by mass or less, plating properties on the steel sheet surface are secured, and occurrence of the alloying unevenness is suppressed.

Patent Literature 3 discloses a technique in which by forming a decarburized layer having a thickness of 10 to 200 μm on the steel sheet surface, an occurrence of cracks on the steel sheet surface is suppressed, and an occurrence of intergranular cracks due to Liquid Metal Embrittlement (LME) is suppressed on a zinc-plated steel sheet produced using the steel sheet.

However, upon further study by the inventors of the present application, the steel sheet described in Patent Literature 1 have some room for improvement in appearance.

The steel sheet described in Patent Literature 2 has a problem that tempering progresses during a slow cooling step in the hot stamping and strength of the hot stamped component decreases. Since the Si content is as small as 0.5% or less, there is a problem that retained austenite is difficult to be generated and good ductility is difficult to be obtained in a hot stamped component.

The steel sheet described in Patent Literature 3 has a problem that strength of the steel sheet surface becomes unstable due to presence of the decarburized layer. Furthermore, it is difficult to form a decarburized layer such that the layer has a uniform thickness, and there is a problem that stability of materials in the width direction and longitudinal direction of the steel sheet is insufficient.

The present invention has been made in view of the above circumstances, and an object thereof is to provide a zinc-plated steel sheet capable of providing a hot stamped component having a better appearance and a stable quality.

CITATION LIST

Patent Literature

Patent Literature 1: JP 2014-159624 A
Patent Literature 2: JP 2007-56307 A
Patent Literature 3: JP 2013-513725 A

SUMMARY OF INVENTION

As a result of various studies, the present inventors have found that the above object can be achieved by the following invention.

A zinc-plated steel sheet for hot stamping according to an aspect of the present invention includes a steel substrate and a plated layer provided on a surface of the steel substrate, in which the steel substrate contains, in terms of % by mass, 0.10 to 0.5% of C, 0.7 to 2.5% of Si, 1.0 to 3% of Mn, and 0.01 to 0.5% of Al, with a balance being iron and inevitable impurities, and the steel substrate has, in an inside thereof, an internal oxide layer containing an oxide containing at least one of Si and Mn having a thickness of 1 μm or more, and a decarburized layer having a thickness of 20 μm or less from an interface with the plated layer toward an internal direction of the steel substrate.

These and other objects, features and advantages of the present invention will become apparent from the following detailed description.

DESCRIPTION OF EMBODIMENTS

When the steel sheet for hot stamping described in Patent Literature 1 is used as a steel substrate of a galvannealed steel sheet, alloying unevenness may occur in rare cases. The present inventors have examined the reason and thus found that the cause is that the steel sheet has a high Si content, and since a solute Si is present on the surface and near the surface, diffusion of Fe from the steel sheet side toward the plated layer is suppressed during alloying after plating.

Moreover, the present inventors have repeatedly examined a method of suppressing the occurrence of alloying unevenness due to the solute Si. As a result, the present inventors have found that by adding steam to an atmosphere in a furnace during reduction annealing of the steel sheet, that is, by reduction annealing in a high dew point atmosphere, the solute Si that is a cause of alloying unevenness decreases on the steel sheet surface and near the surface. This decrease in the solute Si is due to the fact that Si and Mn are oxidized inside the steel sheet to form an internal oxide layer, at which time an oxide film containing oxides of Si and Mn is not formed on the steel sheet surface.

However, when annealing is performed in a high dew point atmosphere, a layer (hereinafter referred to as "decarburized layer") with low carbon content having a relatively low tensile strength is fainted on the steel sheet surface and near the surface. The decarburized layer is formed by reacting steam in a furnace with carbon (C) atoms on the steel sheet surface and near the surface to generate carbon monoxide (CO).

The present inventors have also examined a decarburized layer, and, as a result, found that by setting the decarburized layer to a predetermined thickness or less, it is possible to suppress the effect of the decarburized layer on strength of a zinc-plated steel sheet and a hot stamped component manufactured using the zinc-plated steel sheet.

The present inventors have completed the present invention based on these findings.

According to the present invention, it is possible to provide a zinc-plated steel sheet for hot stamping, which has a better appearance. By applying hot stamping to the zinc-plated steel sheet for hot stamping of the present invention, a hot stamped component of stable quality can be obtained.

Furthermore, according to the present invention, a zinc-plated steel sheet for hot stamping can be stably obtained.

Hereinafter, modes for carrying out the present invention will be described in detail. The present invention is not limited to the embodiments described below.

In the following description, a hot-dip galvanized steel sheet (GI) and a galvannealed steel sheet (GA) are also collectively referred to as "zinc-plated steel sheet", and a hot-dip galvanized plated layer and a hot-dip galvannealed layer are also collectively referred to as "plated layer".

(Configuration of Zinc-Plated Steel Sheet)

The zinc-plated steel sheet according to the embodiment of the present invention has a zinc-plated layer on a surface of a steel substrate. The steel substrate has an internal oxide layer and a decarburized layer.

(Internal Oxide Layer)

The internal oxide layer is a layer formed inside the steel substrate and containing at least one oxide of Si and Mn. The internal oxide layer is formed near the steel substrate surface by high dew point annealing and does not appear on the steel substrate surface.

In the zinc-plated steel sheet according to the embodiment of the present invention, the internal oxide layer of the steel substrate has a thickness of 1.0 μm or more. By forming such an internal oxide layer, occurrence of bare spot in the zinc-plated steel sheet can be sufficiently suppressed, and adhesion between a formed plated layer and the steel substrate can be made sufficiently high. That is, plating properties can be secured.

This is due to the fact that when such an internal oxide layer is formed, Si becomes an oxide near the steel substrate surface, so that a solute Si decreases on the steel substrate surface and near the surface. The solute Si has a function of reducing wettability between the steel substrate and zinc and delaying alloying of plated layer, which causes deterioration of the plating properties.

In the zinc-plated steel sheet according to the embodiment of the present invention, a depth of the internal oxide layer from an interface between the steel substrate and the zinc-plated layer is preferably 1 μm or more, more preferably 1.5 μm or more, and still more preferably 2 μm or more. The depth of the internal oxide layer refers to a depth of a portion of the internal oxide layer closest to the interface. The thickness of the internal oxide layer is preferably 2 μm or more, and more preferably 3 μm or more.

(Decarburized Layer)

The decarburized layer is a region where a carbon content is reduced, which is formed on the steel substrate surface and near the surface by high dew point annealing. In the zinc-plated steel sheet, the decarburized layer is located near an interface between the plated layer and the steel substrate from the interface toward an internal direction of the steel substrate.

In the present embodiment, the decarburized layer is a layer which is formed on the steel substrate surface and near the surface by annealing, and has a carbon content of 80% or less of the carbon content of the steel substrate before annealing. Since the carbon content of the decarburized layer is smaller than that of an undecarburized portion of the steel substrate, the tensile strength is lower than that of the undecarburized portion.

If thickness of the decarburized layer, that is, a depth of the decarburized layer from an interface between the plated layer and the steel substrate in the zinc-plated steel sheet varies, characteristics of the zinc-plated steel sheet also vary. Thus, in the zinc-plated steel sheet according to the present embodiment, the thickness of the decarburized layer is 20 μm or less. The thickness of the decarburized layer is preferably 15 μm or less, and more preferably 10 μm or less. Since it is most preferable that no decarburized layer is formed, the thickness of the decarburized layer is most preferably 0 μm.

When the thickness of the decarburized layer of the steel substrate is 20 μm or less, it is possible to sufficiently reduce variations in mechanical properties of the obtained zinc-plated steel sheet.

During hot stamping of the zinc-plated steel sheet, Fe in the steel substrate diffuses toward the plated layer through an interface between the steel substrate and the plated layer. Depending on hot stamping conditions, Fe located to a depth of about 10 to 20 μm from the steel substrate surface is incorporated in the plated layer. Thus, if the thickness of the decarburized layer in the zinc-plated steel sheet before hot stamping is 20 μm or less, the influence of the decarburized layer on the strength can be suppressed in the hot stamped component.

The internal oxide layer and the decarburized layer may overlap from the steel sheet surface toward the internal direction. As described in Examples described later, the thickness of the decarburized layer can be measured by obtaining a profile of a concentration of each element in a depth direction (thickness direction) from the steel sheet surface by glow discharge optical emission spectrometry (GDOES). The depth and thickness of the internal oxide layer can be measured by a photograph of a cross section of the steel sheet taken by using a scanning electron microscope (SEM).

(Component Composition of Steel Substrate)

Next, the component composition of the steel substrate forming the zinc-plated steel sheet according to the present embodiment will be described. All "%" in the following component compositions mean "mass %".

[C: 0.10-0.5%]

C is an element that contributes to an increase in strength of the hot stamped component as a solid solution strengthening element. In order to obtain a high strength of, for example, 980 MPa or more in the hot stamped component, the lower limit of C content is 0.10% or more. The lower limit of C content is preferably 0.13% or more, more preferably 0.15% or more, and still more preferably 0.17% or more.

On the other hand, the excessive C content degrades weldability of the hot stamped component. Thus, the upper limit of C content is 0.5%. The upper limit of C content is preferably 0.40% or less, more preferably 0.35% or less, and still more preferably 0.30% or less.

[Si: 0.7-2.5%]

Si is an element that contributes to improvement of bonding strength of a spot welded portion of the hot stamped component. Si has an effect of keeping the strength of the hot stamped component by preventing tempering during a slow cooling step in the hot stamping. Furthermore, Si is an element that contributes to improvement of ductility of the hot stamped component by forming retained austenite. In order to effectively exhibit these effects, the lower limit of Si content is 0.7% or more. The lower limit of Si content is preferably 0.75% or more, more preferably 0.80% or more, still more preferably 0.90% or more, and even more preferably 1.0% or more.

On the other hand, the excessive Si content leads to an excessive increase in strength of steel, thereby increasing a rolling load in producing a hot-rolled pickled steel sheet or a cold-rolled steel sheet, that is, the steel substrate. Additionally, the excessive Si content generates scales containing $SiO_2$ on the steel substrate surface during the hot-rolling process, which might degrade surface properties of the plated steel sheet. Thus, the upper limit of Si content is 2.5% or less. The upper limit of Si content is preferably 2.3% or less, and more preferably 2.1% or less.

[Mn: 1.0-3%]

Mn is an element that is effective for improving a quenching property to suppress variations in strength in a high-strength range of the hot stamped component. Furthermore, Mn is an element that promotes the alloying in an alloying process of a plated layer to be described later to thereby ensure the concentration of Fe in the plated layer. In order to effectively exhibit these effects, the lower limit of Mn content is 1.0% or more. The lower limit of Mn content is preferably 1.2% or more, more preferably 1.5% or more, and still more preferably 1.7% or more.

On the other hand, the excessive Mn content leads to an excessive increase in strength of the steel, thereby increasing a rolling load in producing the steel substrate. Thus, the upper limit of Mn content is 3% or less. The upper limit of Mn content is preferably 2.8% or less, and more preferably 2.5% or less.

[Al: 0.01-0.5%]

Al is an element necessary for deoxidation. Thus, the upper limit of Al content is 0.01% or more. The lower limit of Al content is preferably 0.03% or more. On the other hand, the excessive Al content not only saturates the above-mentioned effect, but also increases the amount of inclusions made of alumina and the like, thereby degrading the workability. Thus, the upper limit of Al content is 0.5% or less. The upper limit of Al content is preferably 0.3% or less.

The steel substrate of the zinc-plated steel sheet according to the present embodiment includes those containing the above components and the balance being iron (Fe) and inevitable impurities. Examples of the inevitable impurities include P, S and N.

P is an element that adversely affects the bonding strength of the spot welded portion. The excessive P content leads to segregation on a last-solidified surface of nuggets formed in the spot welding to make the nuggets brittle, resulting in reduction in bonding strength. Thus, the upper limit of P content is preferably 0.02% or less, and more preferably 0.015% or less.

Like P, S is an element that adversely affects the bonding strength of the spot welded portion. The excessive S content assists in generating intergranular cracking due to the grain boundary segregation in the nuggets, reducing the bonding strength. Thus, the upper limit of S content is preferably 0.01% or less, and more preferably 0.008% or less.

N bonds with B to reduce the amount of solute B element, adversely affecting the quenching property of the steel substrate. The excessive N content increases the amount of precipitation of nitrides, adversely affecting toughness of the steel substrate. Thus, the upper limit of N content is preferably 0.01% or less, and more preferably 0.008% or less. The N content is usually 0.001% or more taking into consideration the cost of steel production and the like.

In the present invention, in addition to the components described above, B can be further added as a selected element when necessary.

[B: 0.005% or less (excluding 0%)]

B is an element that improves the quenching property of the steel. To exhibit this effect, the B content is preferably 0.0003% or more. The lower limit of B content is more preferably 0.0005% or more, and still more preferably 0.0010% or more. On the other hand, when the B content exceeds 0.005%, coarse particles of borides might be precipitated in the hot stamped component, degrading the toughness of the component. Accordingly, the upper limit of B content is preferably 0.005% or less, and more preferably 0.004% or less.

(Method for Producing Zinc-Plated Steel Sheet)

The zinc-plated steel sheet according to the present embodiment can be produced, for example, through the following steps sequentially: casting of steel with a predetermined composition, heating, hot-rolling, pickling, if necessary, cold-rolling, hot-dip galvanizing, and if necessary, alloying.

In the present embodiment, as described later, in order to form the internal oxide layer and the decarburized layer defined in the present embodiment, annealing conditions by use of a reduction furnace in an annealing step included in the hot-dip galvanizing step, that is, annealing conditions in heat treatment under a reductive atmosphere are suitably controlled.

Hereinafter, the method for producing a zinc-plated steel sheet according to the present embodiment will be described in the order of steps.

First, steel satisfying the component composition described above is cast, and heated. Heating conditions are not particularly limited. Conditions normally used for the heat treatment can be adopted as appropriate, but the heating is preferably performed at a temperature of about 1100° C. to 1300° C.

Then, the cast steel is hot-rolled to obtain a hot-rolled steel sheet. Hot-rolling conditions are not particularly limited. Conditions used for the hot-rolling can be adopted as appropriate. Preferable conditions are substantially as follows.

Finish rolling temperature (Finisher Delivery Temperature FDT): 800 to 950° C.

Coiling temperature (CT): 500 to 700° C.

The upper limit of the thickness of the hot-rolled steel sheet is preferably 3.5 mm or less. The upper limit of the thickness of the hot-rolled steel sheet is more preferably 3.0 mm or less, and still more preferably 2.5 mm or less. The lower limit of the thickness of the hot-rolled steel sheet is preferably 2.0 mm or more.

The hot-rolled steel sheet is pickled in the pickling step to produce a hot-rolled pickled steel sheet. In the pickling step, at least scales formed after the hot-rolling step have only to be removed.

For example, a coil having a high coiling temperature during hot rolling often has a grain boundary oxide layer formed of Si or Mn oxides in the vicinity of an interface between the hot-rolled scales and the steel sheet. However, even if the grain boundary oxide layer is present, the grain boundary oxide layer does not adversely affect such as bare spot during a plating process. Thus, in the pickling step, the grain boundary oxide layer is not necessarily removed.

However, in order to stabilize surface properties of the zinc-plated steel sheet, such as an appearance or roughness, it is preferable to remove the grain boundary oxide layer as much as possible. In order to remove the grain boundary oxide layer, a pickling method normally used can be appropriately adopted. Examples of the method of pickling the hot-rolled steel sheet include a method in which hydrochloric acid heated to 80 to 90° C. or the like is used to pickle the steel sheet for a period of time from 20 to 300 seconds. At this time, a suitable amount of at least one of a pickling accelerator and an inhibitor is preferably added to the hydrochloric acid. For example, a compound containing a mercapto group can be used as the pickling accelerator, and, for example, an amine-based organic compound can be used as the inhibitor.

The hot-rolled pickled steel sheet preferably has substantially the same thickness as that of the hot-rolled steel sheet.

The hot-rolled pickled steel sheet may be cold-rolled to form a cold-rolled steel sheet if necessary. The zinc-plated steel sheet according to the present embodiment is suitably used in automotive parts, particularly, for the purpose of reduction in weight of motor vehicles or the like. For this reason, the steel substrate forming the zinc-plated steel sheet is preferably the cold-rolled steel sheet in terms of accuracy of size and flatness.

A cold-rolling ratio, that is, a reduction ratio in cold rolling is preferably controlled to be within a range of about 20 to 70%, taking into consideration productivity in factories. The upper limit of the thickness of the cold-rolled steel sheet is preferably 2.5 mm or less. The upper limit of the thickness of the cold-rolled steel sheet is more preferably 2.0 mm or less, and still more preferably 1.8 mm or less.

Then, the thus-obtained hot-rolled pickled steel sheet or cold-rolled steel sheet (hereinafter also collectively referred to as "base steel sheet") is fed to a reduction furnace type continuous plating process.

In general, the process performed on the reduction furnace type hot-dip galvanizing line is divided into a pretreatment step, an annealing step, and a plating step. In the plating step, an alloying process is also performed if necessary.

The annealing step on the hot-dip galvanizing line is usually composed of a reduction furnace, and a cooling zone. The present embodiment is most characterized by the suitable control of the annealing conditions in the reduction furnace, particularly the dew point of the reduction atmosphere.

Obviously, the method according to the present embodiment is not limited to the embodiment described above, and can also be implemented, for example, by applying the above-mentioned hot-dip galvanizing line to a non-oxidation furnace type continuous annealing line. In the following, the method according to the present embodiment will be described based on the above embodiment.

First, the steel substrate is pretreated. The pretreatment is usually performed to remove oil (fat and oil) or stains on the steel substrate surface, and typically, performed by alkaline degreasing.

As alkaline contained in a degreasing liquid used in the alkaline degreasing, for example, caustic soda, silicate, or a mixture thereof is preferably used, and the alkaline is not particularly limited as long as it can remove the fat and oil, and the like in the form of water-soluble soap. In order to improve the degreasing properties, electrolytic cleaning, a scrubber process, or addition of a surfactant agent and a chelating agent to a degreasing solution may be performed.

In the present embodiment, as long as the steel substrate surface is suitably degreased, the pretreatment method is not limited, and the above processes may be performed alone or in any combination. When the alkaline degreasing is performed as the pretreatment, the steel substrate is hot-rinsed (washed with hot water) to remove the degreasing solution attached to the steel substrate. The steel substrate washed with hot water is dried by a dryer or the like.

Next, the steel substrate pretreated is introduced into the reduction furnace, and then annealed. That is, the steel substrate is subjected to the heat treatment under the reductive atmosphere. The annealing conditions at this time are set to a dew point of the reducing atmosphere of −20 to 0° C. and an annealing temperature of 500 to 720° C. The retaining time at the annealing temperature, that is, the annealing time is set to 90 to 400 seconds. The annealing process in the above-mentioned temperature range is called a soaking process, In this case, the annealing temperature is called a soaking temperature, and the annealing time is called a soaking time.

The lower limit of the dew point of the reducing atmosphere is preferably −15° C. or higher, and more preferably −10° C. or higher.

The composition of the reducing atmosphere is not particularly limited as long as it is reducing, and, for example, an $H_2$ concentration in an $H_2$—$N_2$ mixed gas is preferably 1 to 30% by volume.

The lower limit of the annealing temperature is preferably 530° C. or higher, more preferably 560° C. or higher, and still more preferably 600° C. or higher. The upper limit of the annealing temperature is preferably 700° C. or lower, and more preferably 680° C. or lower.

The lower limit of the annealing time is preferably 120 seconds or more, and more preferably 150 seconds or more.

The upper limit of the annealing time is preferably 270 seconds or less, and more preferably 240 seconds or less. The annealing time can be controlled by the speed (hereinafter also referred to as "line speed" or abbreviated as "LS") at which the steel substrate passes through the reduction furnace.

From the viewpoint of energy saving, before entering the reduction furnace, the steel substrate pretreated may be pre-heated in a preheating furnace under the reducing atmosphere using exhaust gas. The preheating conditions at this time are not particularly limited as long as the dew point of the reducing atmosphere is in the above range.

The above-mentioned annealing conditions are determined by a number of basic experiments from the viewpoint of (1) fanning the internal oxide layer in the steel sheet to suppress the concentration of the solute Si on the steel substrate surface and generation of Si-based oxide on the steel substrate surface accompanying the concentration of Si, and thus to suppress occurrence of bare spot and alloying unevenness, and (2) reducing the decarburized layer formed on the steel sheet surface and suppressing variations in mechanical properties of the zinc-plated steel sheet and components after hot stamping.

From the viewpoint of (1) above, when the upper and lower limits of the dew point of the reducing atmosphere during annealing, the upper and lower limits of the annealing temperature, and the upper and lower limits of the annealing time are outside the above-mentioned ranges, bare spot occurs.

In particular, when the dew point of the reducing atmosphere is excessively low, when the annealing temperature is excessively high, or when the annealing time is excessively long, the Si-based oxides are easily formed on the surface, which tends to cause bare spot.

In contrast, when the annealing temperature is excessively low, or when the annealing time is excessively short, Fe-based oxides are more likely to remain, which also tends to cause bare spot. If the dew point of the reducing atmosphere is too high, adverse effects such as oxidation of the steel sheet and equipment in the furnace may occur.

From the viewpoint of (2) above, if the annealing temperature is too high, or if the annealing time is too long, the decarburized layer is likely to have a thickness of 20 μm or more, and variations in mechanical properties of the components after hot stamping are likely to occur.

Specifically, it is preferable that the annealing conditions be suitably controlled by a balance between the dew point of the reducing atmosphere and the temperature and time during annealing so that bare spot, alloying unevenness and variations in mechanical properties do not occur. For example, when the dew point of the reducing atmosphere is low, the annealing temperature can be reduced, or the annealing time can be shortened. In contrast, when the dew point of the reducing atmosphere is high, the annealing temperature can be increased, or the annealing time can be lengthened.

Aside from the application to the hot stamping, when the steel containing a large amount of Si is galvanized like the present embodiment, in order to prevent the occurrence of bare spot, for example, a method of pre-plating before an annealing step, and an oxidation reduction method of oxidizing before reduction annealing in a reduction furnace are generally employed. However, in the present embodiment, plating is performed after the suitable reduction annealing as described in detail below, and therefore, these methods are unnecessary. The pre-plating method has to employ special equipment, which leads to an increase in cost. In the production using the oxidation reduction method, an oxide layer formed at an interface between a plated layer and a steel substrate inhibits diffusion of Fe into the plated layer during heating in the hot stamping, and a heating time required to prevent LME becomes longer, which reduces the press productivity.

Then, the steel substrate discharged from the reduction furnace is cooled in the cooling zone. Usually, the cooling zone includes a slow-cooling zone, a rapid-cooling zone, and an adjustment zone. The adjustment zone is also called a holding zone. However, cooling methods may be performed on conditions normally used not to cause bare spot. For example, the cooling methods can include one method of cooling a steel sheet by spraying gas of the reducing atmosphere onto the steel sheet.

After the continuous annealing step in this way, galvanizing is performed. In details, a hot-dip galvanized steel sheet (GI) is produced by a hot-dip galvanizing step. Alternatively, the above-mentioned GI may be alloyed to produce a hot-dip galvannealed steel sheet (GA).

The above-mentioned hot-dip galvanizing step is not particularly limited thereto, and can be performed by one method normally used. For example, a hot-dip galvanizing bath may be controlled to be at a temperature of about 430 to 500° C. The coating weight of the hot-dip galvanized layer (which is the same as that of the hot-dip galvannealed layer described below) is preferably 30 $g/m^2$ or more, more preferably 40 $g/m^2$ or more, and still more preferably more than 75 $g/m^2$ from the viewpoint of ensuring the corrosion resistance. On the other hand, the coating weight of the hot-dip galvanized layer (in particular, hot-dip galvannealed layer) is preferably small from the viewpoint of easily achieving the predetermined Fe concentration of the plated layer in the present invention. Thus, the coating weight of the hot-dip galvanized layer is preferably 120 $g/m^2$ or less, and more preferably 100 $g/m^2$ or less.

The alloying step is not particularly limited thereto, and can be performed by one method normally used. In the alloying step, the Fe concentration in the plated layer is increased. From this point of view, the alloying temperature is preferably controlled to be at a temperature of about 500 to 700° C., for example. The alloying temperature is more preferably 530° C. or higher, still more preferably 570° C. or higher, and even more preferably 600° C. or higher. On the other hand, if the alloying temperature is too high, the Fe concentration in the plated layer will be too high, so that the alloying temperature is preferably 680° C. or lower, and more preferably 650° C. or lower.

Steps after the galvanizing step are not particularly limited thereto, and can be performed by one process method normally used. Usually, a skin pass rolling process, a tension hot air leveling process, lubrication, and the like are performed. These processes may be performed on conditions normally used if necessary, or may not be performed if unnecessary.

Recommended conditions for the re-annealing are as follows. That is, the heating temperature (re-annealing temperature) in the re-annealing is preferably 400° C. or higher, and more preferably 450° C. or higher. On the other hand, from the viewpoint of suppressing evaporation of zinc, the re-annealing temperature is preferably 750° C. or lower, and more preferably 700° C. or lower.

The time for holding the re-annealing temperature (re-annealing time) can be appropriately set by a heating method or the like. For example, in the case of furnace heating, the re-annealing time is preferably 1 hour or more, and more preferably 2 hours or more. In the case of induction heating, the re-annealing time is preferably 10 seconds or more. On the other hand, from the viewpoint of suppressing evaporation of zinc, in the case of the furnace heating, the re-annealing time is preferably 15 hours or less, and more preferably 10 hours or less. In the case of the induction heating, the re-annealing time is preferably 3 minutes or less, and more preferably 1 minute or less.

The zinc-plated steel sheet (GI or GA) thus-obtained is suitable for use as a steel sheet for hot stamping.

In the present embodiment, the hot stamping step is not particularly limited, and the methods normally used can be adopted. For example, there is a method in which according to a normal hot stamping method, the above steel sheet is heated to a temperature of an $Ac_3$ transformation point or higher to be converted to austenite, and then, for example, the temperature at the time when the forming is completed, that is, the temperature at the time when a die reaches a bottom dead center is set to about 550° C. or higher. The heating methods can include the furnace heating, energization heating, induction heating, and the like.

As the heating condition, when the holding time (also referred to an in-furnace time in the case of furnace heating; and referred to a time from the start to the end of heating in the case of energization heating or induction heating) at a temperature of the $Ac_3$ transformation point or higher is controlled to be preferably 30 minutes or less, more preferably 15 minutes or less, and still more preferably 7 minutes or less, grain growth of austenite is suppressed to improve the properties including hot drawability, and toughness of the hot stamped component. The lower limit of the holding time at a temperature of the $Ac_3$ transformation point or higher is not particularly limited, as long as the temperature reaches the $Ac_3$ transformation point or higher during heating.

When the hot stamped component is produced using the zinc-plated steel sheet according to the present embodiment, it is possible to further employ a general step and conditions, including cutting according to the shape of a component, and the like in addition to the hot stamping step. Examples of the hot stamped components include motor vehicle chassis, so-called suspension systems, and reinforcing parts.

The present specification discloses various technical aspects as mentioned above. Among them, major techniques will be summarized as follows.

A zinc-plated steel sheet for hot stamping according to an aspect of the present invention includes a steel substrate and a plated layer provided on a surface of the steel substrate, in which the steel substrate contains, in % by mass: C: 0.10 to 0.5%, Si: 0.7 to 2.5%, Mn: 1.0 to 3%, and Al: 0.01 to 0.5%, with the balance being iron and inevitable impurities, and the steel substrate has, in the inside thereof, an internal oxide layer containing an oxide containing at least one of Si and Mn having a thickness of 1 μm or more, and a decarburized layer having a thickness of 20 μm or less from an interface with the plated layer toward an internal direction of the steel substrate.

With such a configuration, it is possible to obtain a zinc-plated steel sheet for hot stamping in which the occurrence of appearance defects such as bare spot and alloying unevenness is further suppressed.

In the above configuration, the steel substrate may further contain B in an amount of 0.005% or less (excluding 0%). This makes it possible to enhance the quenching property of the steel substrate and enhance the strength of the zinc-plated steel sheet for hot stamping.

A method for producing a zinc-plated steel sheet for hot stamping according to another aspect of the present invention is a method for producing the zinc-plated steel sheet for hot stamping and is characterized in that a cold-rolled steel sheet satisfying a component composition of the zinc-plated steel sheet for hot stamping is held at 500 to 720° C. for 90 to 400 seconds in a reducing atmosphere with a dew point of −20 to 0° C. and then plated.

With such a configuration, the zinc-plated steel sheet for hot stamping can be obtained.

The present invention will be described in more detail using examples below. However, these examples are never construed to limit the scope of the invention, and the present invention can also be implemented with modifications being added within a scope adaptable to the purposes described above and below, and any of them is to be included within the technical range of the present invention.

EXAMPLES

After a slab made of steel having the component composition shown in Table 1 was heated to 1200° C., hot rolling under the conditions of the finish rolling temperature (FDT) and the coiling temperature (CT) shown in Table 2, descaling treatment by the pickling step, and cold rolling were performed sequentially to obtain a cold-rolled steel sheet. The cold-rolled steel sheet was used as a steel substrate of a plated steel sheet.

TABLE 1

| Component composition (mass %) Balance: Fe and inevitable impurities | | | | | | | |
|---|---|---|---|---|---|---|---|
| C | Si | Mn | Al | P | S | N | B |
| 0.22 | 1.15 | 2.2 | 0.043 | 0.01 | 0.0009 | 0.0036 | 0.0021 |

Each cold-rolled steel sheet obtained in this way was evaluated for respective items below.

(Depth and Thickness of Internal Oxide Layer)

The cold-rolled steel sheet was cut to produce a test piece with a size of 10 mm×20 mm. The test piece was embedded in a support substrate, followed by polishing its cross section, and then slightly etched with nital. Thereafter, a portion of the cross section in the vicinity of the plated layer was observed by FE-SEM (SUPRA35, manufactured by ZEISS) at a magnification of 1500 times with a backscattered electron image. Then, on the steel substrate side from an interface between a plated alloy layer and the steel substrate, inside the steel substrate, a region where at least one oxide of Si and Mn observed as a minute black spot was distributed was taken as an internal oxide layer. A case where the average thickness of the internal oxide layer was 1 μm or more and a depth from an interface between the plated alloy layer and the steel substrate was 1 μm or more was evaluated as good (acceptable), and the other cases were evaluated as poor (unacceptable). The evaluation results are shown in Table 3 below.

(Thickness of Decarburized Layer)

The thickness of the decarburized layer was calculated by adding the effects of soaking time, soaking temperature and atmosphere dew point to numerical values obtained from a model equation created by the method described below. When the calculated thickness of the decarburized layer (depth from the surface of the cold-rolled steel sheet) was 20 μm or less, it was considered that the mechanical properties could be secured, and this case was evaluated as good (acceptable). A case where the thickness was more than 20

μm was evaluated as poor (unacceptable). The evaluation results are shown in Table 3 below.

(Method of Creating Model Equation)

The cold-rolled steel sheet was cut to produce a test piece with a size of 100 mm×200 mm. This test piece was annealed by changing the annealing temperature, the dew point of the atmosphere (hereinafter also simply referred to as "dew point"), and the annealing time with a plating simulator. The dew point and annealing temperature were as shown in Table 2 below, and the annealing time was 0s, 120s, and 240s for each dew point and annealing temperature. With respect to the annealed test piece, a carbon concentration profile in the depth direction (thickness direction) from the steel sheet surface was obtained by GDOES, and the thickness of the decarburized layer was measured. The thickness of the decarburized layer was defined as a depth from the surface of the test piece to a position where the carbon concentration was 80% of the carbon concentration of the steel substrate before annealing.

TABLE 2

| Dew point (° C.) | Annealing temperature (° C.) | Decarburization rate constant K (μm/s) |
| --- | --- | --- |
| 0 | 680 | 0.0864 |
| 0 | 700 | 0.1471 |
| 0 | 720 | 0.2411 |
| 0 | 740 | 0.3338 |
| −10 | 680 | 0.0953 |
| −10 | 700 | 0.1377 |
| −10 | 720 | 0.2034 |
| −10 | 740 | 0.2807 |
| −15 | 680 | 0.0716 |
| −15 | 700 | 0.1146 |
| −15 | 720 | 0.1594 |
| −15 | 740 | 0.2154 |

A relationship between the annealing time and the thickness of the decarburized layer is represented by the following equation (1):

$$X = Kt \quad (1)$$

Here, X: decarburized layer thickness (μm), K: decarburization rate constant (μm/s), and t: annealing time (s).

From the above equation (1), the decarburization rate constant K for each annealing temperature and dew point was determined as a slope of a graph obtained by plotting when the horizontal axis was the annealing time t and the vertical axis was the measured decarburized layer thickness X. The obtained K is shown in Table 2.

A relationship between the decarburization rate constant and the annealing temperature is represented by the following Arrhenius equation:

$$K = A \exp(-E/RT)$$

Here, K: decarburization rate constant (μm/s), A: constant (μm/s), E: constant (J/mol), R: gas constant (8.31 J/molK), and T: annealing temperature (K).

The Arrhenius equation can be transformed into the following equation (2):

$$\ln K = \ln A + (-E/R) \times 1/T \quad (2)$$

When the horizontal axis was 1/T (reciprocal of the annealing temperature expressed in absolute temperature) and the vertical axis was ln K, from the above equation (2), E was obtained from a slope of a graph obtained by plotting the value shown in Table 2, and A was obtained from an intercept. E was consistent at 146 kJ/mol regardless of the dew point. A was a value represented by the following equation (3):

$$A = 2.49 \times 10^5 \times DP + 1.15 \times 10^7 \quad (3)$$

Here, DP is the dew point (° C.).

From the above, K in the above equation (1) was a value represented by the following equation. The equation obtained by substituting K into the equation (1) is the model equation.

$$K = (2.49 \times 10^5 \times DP + 1.15 \times 10^7) \times \exp((-146000/8.31) \times 1/T)$$

In the lab experiment, when the annealing temperature was 700° C. or lower, the effect of the dew point was not seen at a dew point of −10° C. or higher, and thus when the annealing temperature was 700° C. or lower and the dew point was −10° C. or higher, K was calculated with DP=−10° C.

(Plating State)

The cold-rolled steel sheet was cut to produce a test piece with a size of 100 mm×150 mm. The test piece was electrolytically degreased in 3% sodium orthosilicate at 60° C. at a current of 20 A for 20 seconds, and then washed with running water for 5 seconds. The test piece was subjected to alkaline degreasing in this way and then annealed (soaked) by a plating simulator. Table 2 shows the soaking temperature, the dew point of the reducing atmosphere, and the line speed (LS) as soaking conditions. The line speed is the speed of the test piece passing through an annealing furnace. The reducing atmosphere was a mixed gas containing 5% by volume of $H_2$ gas and the balance which was $N_2$ gas.

Specifically, under the above-mentioned reducing atmosphere, the test piece was heated from room temperature to a soaking temperature and then subjected to the soaking process under the conditions shown in Table 2, followed by cooling from the soaking temperature down to 460° C. Then, a hot-dip galvanized steel sheet (GI) was obtained by plating in a galvanizing bath having an Al content of 0.1% by mass and a temperature of 460° C. and wiping. In addition, alloying treatment was carried out at an alloying temperature of 550° C. for an alloying time of 20 seconds to obtain a hot-dip galvannealed steel sheet (GA).

With respect to the above GA, the steel sheet surface in a range (about 100 mm×120 mm) immersed in the galvanizing bath was visually observed to determine an area ratio of bare spot and confirm presence or absence of alloying unevenness. Regarding the bare spot, a case where the area ratio of bare spot was 5% or less was evaluated as good (acceptable), and a case where the area ratio of bare spot was more than 5% was evaluated as poor (unacceptable). Regarding the alloying unevenness, a case where the Fe concentration was 8% or more was evaluated as good (acceptable), and a case where the Fe concentration was less than 8% was evaluated as poor (unacceptable). The results are shown in Table 3. For No. 17, the depth and thickness of the internal oxide layer were not measured.

TABLE 3

| No. | Soaking Temperature (° C.) | Annealing Atmosphere dew point (° C.) | LS (mpm) | Soaking Time (s) | Internal oxide layer thickness (μm) | Decarburized layer thickness (μm) | Plating properties Bare spot | Alloying unevenness | Division |
|---|---|---|---|---|---|---|---|---|---|
| 1 | 630 | 0 | 45 | 400 | 1 | 6 | good | good good | Present invention example |
| 2 | 630 | 0 | 60 | 300 | 1 | 4 | good | good good | Present invention example |
| 3 | 670 | −45 | 45 | 400 | 0 | 0 | good | good poor | Comparative Example |
| 4 | 670 | −20 | 45 | 400 | 1 | 6 | good | good good | Present invention example |
| 5 | 670 | 0 | 45 | 400 | 1 | 9 | good | good good | Present invention example |
| 6 | 670 | 0 | 60 | 300 | 1 | 7 | good | good good | Present invention example |
| 7 | 700 | −45 | 45 | 400 | 0 | 0 | good | poor poor | Comparative Example |
| 8 | 700 | −20 | 45 | 400 | 1 | 12 | good | good good | Present invention example |
| 9 | 700 | −20 | 60 | 300 | 1 | 9 | good | good good | Present invention example |
| 10 | 700 | 0 | 45 | 400 | 2 | 17 | good | good good | Present invention example |
| 11 | 700 | 0 | 60 | 300 | 1 | 13 | good | good good | Present invention example |
| 12 | 700 | 0 | 90 | 200 | 1 | 9 | good | good good | Present invention example |
| 13 | 700 | 0 | 200 | 90 | 1 | 5 | good | good good | Present invention example |
| 14 | 720 | −45 | 45 | 400 | 0 | 0 | good | poor poor | Comparative Example |
| 15 | 720 | −20 | 45 | 400 | 2 | 18 | good | good good | Present invention example |
| 16 | 720 | −20 | 60 | 300 | 1 | 12 | good | good good | Present invention example |
| 17 | 735 | 0 | 45 | 400 | — | 38 | poor | good good | Comparative Example |

The data from Table 3 lead to the following consideration.

In Nos. 1, 2, 4 to 6, 8 to 13, 15, and 16, the soaking conditions under the reductive atmosphere satisfy the requirements of the present invention, and the thickness of the decarburized layer, the area ratio of bare spot, and the alloying unevenness were all evaluated as good. Although not shown in Table 3, in Nos. 1 to 16, the depth of the internal oxide layer was 1 to 3 μm, and all of them were evaluated as good.

In No. 3, No. 7 and No. 14, the alloying unevenness was evaluated as poor. This is probably because the dew point of the reducing atmosphere is as low as −45° C., and no internal oxide layer is formed, or the thickness and depth of the internal oxide layer are insufficient.

Among these, in No. 7 and No. 14, the area ratio of bare spot was also evaluated as poor. This is probably because Si-based oxide is formed on the steel substrate surface.

In No. 17, the thickness of the decarburized layer was evaluated as poor. This is probably because the soaking temperature is too high.

This application is based on Japanese Patent Application Serial No. 2018-037132 filed in Japan Patent Office on Mar. 2, 2018, the contents of which are hereby incorporated by reference.

To describe the present invention, the invention has been described in the foregoing description appropriately and sufficiently using embodiments with reference to specific examples and the like. However, it is to be understood that changes and/or modifications to the foregoing embodiments will readily occur to those skilled in the art. Therefore, unless a change or modification made by those skilled in the art is beyond the scope of the appended claims, such change or modification is to be embraced within the scope of the appended claims.

INDUSTRIAL APPLICABILITY

The present invention has a wide range of industrial applicability in technical fields relating to a zinc-plated steel sheet for hot stamping.

The invention claimed is:

1. A zinc-plated steel sheet for hot stamping, comprising:
a steel substrate; and
a plated layer provided on a surface of the steel substrate,
wherein the steel substrate comprises, in % by mass relative to a total mass of the steel substrate:
C: 0.10 to 0.5%,
Si: 0.7 to 2.5%,
Mn: 1.0 to 3%, and
Al: 0.01 to 0.5%,
wherein the steel substrate comprises an internal oxide layer and a decarburized layer,
wherein the internal oxide layer comprises an oxide of at least one selected from the group consisting of Si and Mn and has a thickness of at least 1 μm,
wherein the decarburized layer has a thickness of 20 μm or less from an interface with the plated layer toward an internal direction of the steel substrate,
wherein the internal oxide layer is a layer formed inside the steel substrate and near a steel substrate surface and the internal oxide layer does not appear on the steel substrate surface,
wherein an oxide film containing oxides of Si is not formed on the steel substrate surface.

2. The zinc-plated steel sheet of claim 1, wherein the steel substrate further comprises, in % by mass relative to the total mass of the steel substrate, 0.005% or less, excluding 0%, of B.

3. A method for producing the zinc-plated steel sheet of claim 1, the method comprising:
holding a cold-rolled steel sheet at 500 to 720° C. for 120 to 400 seconds at a line speed of 45 to 200 mpm, in a reducing atmosphere with a dew point of −20 to 0° C., and
plating the cold-rolled steel sheet with a zinc-plated layer after the holding,
wherein the cold-rolled steel sheet comprises, in % by mass relative to a total mass of the cold-rolled steel sheet:
C: 0.10 to 0.5%,
Si: 0.7 to 2.5%,
Mn: 1.0 to 3%, and
Al: 0.01 to 0.5%.

* * * * *